(12) United States Patent
Terajima

(10) Patent No.: US 9,256,044 B2
(45) Date of Patent: Feb. 9, 2016

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (CN); Huizhou Daya Bay Jss Optical Technology.Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO., LTD., Huizhou (CN); JSS OPTICAL TECHNOLOGY CO., LTD., Hong Kong (HK); HUIZHOU DAYA BAY JSS OPTICAL TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 14/447,677

(22) Filed: Jul. 31, 2014

(65) Prior Publication Data

US 2015/0036231 A1  Feb. 5, 2015

(30) Foreign Application Priority Data

Aug. 2, 2013 (JP) ................................. 2013-161058

(51) Int. Cl.
*G02B 7/02* (2006.01)
*G02B 7/08* (2006.01)

(52) U.S. Cl.
CPC . *G02B 7/023* (2013.01); *G02B 7/08* (2013.01)

(58) Field of Classification Search
CPC .......... G02B 7/08; G02B 27/646; G02B 7/09; G02B 7/04; G02B 7/023; G02B 7/102; G02B 13/001; G02B 7/005; G02B 7/022; G02B 7/10; G02B 13/0035; G02B 13/0065; G02B 13/009; G02B 15/14; G02B 15/15; G02B 21/361; G02B 21/365; G02B 26/0825; G02B 27/0006; G02B 27/64; G02B 3/14; G02B 7/008; G02B 7/02; G02B 7/182; G02B 7/1821; G02B 7/1827; G02B 2205/0053; G02B 2205/0046; G03F 7/70775; G03F 7/70758
USPC ......................................................... 359/824
See application file for complete search history.

(56) References Cited

U.S. PATENT DOCUMENTS 7,400,463 B1 * 7/2008 Wu ................................ 359/824

* cited by examiner

*Primary Examiner* — Alicia M Harrington
(74) *Attorney, Agent, or Firm* — Hemisphere Law, PLLC

(57) ABSTRACT

The present invention provides a lens driving device includes at least two spring components each of which includes an inner side retaining part, an outer side retaining part, a plurality of wrist parts configured between the inner and outer side retaining parts and prolonged along the circumference direction, inner side connecting parts for connecting one ends of the wrist parts with the inner side connecting part, and outer side connecting parts for connecting the other ends of the wrist parts with the outer side retaining part. Moreover, serpentine necking parts are formed at the roots of the connecting part of the inner side retaining part, straight line-shaped necking parts are formed at the roots of the connecting part of the outer side retaining part, so that stresses acting on the inner side connecting parts and the outer side connecting parts during assembling are absorbed.

13 Claims, 14 Drawing Sheets

LENS DRIVING DEVICE

CROSS-REFERENCE TO RELATED APPLICATIONS

None.

BACKGROUND OF THE INVENTION

1. Field of the Invention

The present invention relates to a lens driving device which is capable of applying an offset force to a spring component for suspending a lens support on a box body.

2. Description of Related Art

FIG. 11 is a section view illustrating an example of an existing voice coil motor type lens driving device 50. The lens driving device 50 suspends the lens support 52 which is used for keeping the lens 51 on a box body 53 by utilizing a spring component 56. The spring component 56 is composed of a front side spring component 56 A and a back side spring component 56B with approximately same structure. Moreover, a coil 54 for driving the lens is winded around a Z axis which acts as the optical axis of the lens 51. The coil 54 is installed on the lens support 52. And the magnet 55 for driving the lens is installed inside the box body 53 and is configured to be cylindrical so that the magnet 55 is magnetized in radial directions of the lens support 52. Under the condition that the coil 54 for driving the lens is electrified, the coil 54 for driving the lens generates a Lorentz force in a direction towards the object to be shot (hereinafter, also called in front of the Z axis, in the +Z direction or on the +Z side). The +Z direction is shown as an arrow labeled "Z" in FIG. 11, so that the lens support 52 moves to a position where a restoring force of the spring component 56 is balanced by the Lorentz force generated by the coil 53, and thus the lens 51 can move to a preset position.

Therefore, the box body 53 is provided with a disc-shaped base plate 53a of which an opening part 53h forms in the central part; a cylindrical side wall 53b, which is set up on the outer edge part of the base plate from the +Z direction; and a circular ring-shaped restricting part 53c, which is projected out from the inner edge part of the opening part 53h, and extends towards the lens support 52, and the position of the lens support 52 is restricted at the backmost position when the coil 54 for driving the lens is not electrified. Moreover, a magnet yoke 57 in the same figure shown as two L-shaped components in the section view is used for effectively guiding a magnetic field from the magnet 55 for driving the lens to the coil 54 for driving, a cylinder part 57a as a vertical sheet is configured between the magnet 55 and the side wall 53b of the box body, and a circular ring part 57b as a horizontal sheet is configured on the +Z side of the magnet 55 (for example, referring to patent literature 1: JP patent application 2007-171764).

FIG. 12A and FIG. 12B are diagrams illustrating a structural example of the existing spring component 56. The spring component 56 is provided with a circular ring-shaped inner side retaining part 56a installed on the lens support 52, an outer side retaining part 56b installed on the box body, a plurality of wrist parts 56c configured between the inner side retaining part 56a and the outer side retaining part 56b, a plurality of inner side connecting parts 56m each for connecting the inner side retaining part 56a with its one end and connecting an end of a corresponding one of the plurality of wrist parts 56c with its other end, and a plurality of outer side connecting parts 56n each for connecting the outer side retaining part 56b with its one end and connecting the other end of a corresponding one of the plurality of wrist parts 56c. When the spring component 56 is observed from the side of the object to be shot (in the +Z direction), each wrist part 56c is extended in the circumferential anti-clockwise direction (or clockwise direction) from the inner side retaining part 56a via a corresponding inner side connecting part 56m, and is connected with the outer side retaining part 56b through a corresponding outer side connecting part 56n. The wrist parts 56c are configured for playing a role of a spring in suspending the lens support 52 on the box body.

However, the lens driving device 50 is assembled by utilizing the following method. Namely, as shown in FIG. 13A, after the inner side retaining part 56a of the back side spring component 56B is fixedly connected (connected and fixed) to the end of the lens support 52 on the −Z side, the outer side retaining part 56b of the back side spring component 56B is pressed on the surface of the base plate 53a of the box body on the +Z side by utilizing clamps and so on, then an offset force is applied to the outer side retaining part 56b, and meanwhile the outer side retaining part 56b is fixedly connected onto the box body 53.

Then, as shown in FIG. 13B, the outer side retaining part 56b of the back side spring component 56B is wrapped from the +Z side by using a spacer 58, and after the magnet yoke 57 and the magnet 55 for driving the lens are overlapped on the spacer 58, the inner side retaining pat 56a of the front side spring component 56A is fixedly connected onto the end of the lens support 52 on the +Z side.

Finally, as shown in FIG. 13C, the outer side retaining part 56b of the front side spring component 56A is pressed on one surface of the circular ring part 57b of the magnet yoke 57 on the +Z side by using unshown clamps, and an offset force is applied to the outer side retaining part 56b, meanwhile the outer side retaining part 56b is fixedly connected with the box body 53.

In the assembling method as mentioned above, for the inner side retaining part 56a and the outer side retaining part 56b: after the inner side retaining part 56a of the spring component 56 is fixedly connected onto the lens support 52 and the inner side retaining part 56a and the lens support 52 are coplanar in a manner that the offset force is not applied, the outer side retaining part 56b is fixedly connected with the box body 53 or the magnet yoke 57 in a state that the offset force is applied to the outer side retaining part 56b towards the −Z side.

Therefore, the lens support 52 receives an acting force in the −Z direction opposite to the +Z direction all the time under the effect of the restoring force of the spring component 56, thus the lens support 52 can also be stably retained at the backmost position even if the optical axis of the lens driving device 50 is inclined relative to the plumb line direction.

However, as indicated by the hollow arrow G51 shown in FIG. 12A, if the spring component 56 is the front side spring component 56A, a pressing force is applied to the inner side retaining part 56a from the +Z direction to the −Z direction, and if the spring component 56 is the back side spring component 56B, a pressing force is applied to the inner side retaining part 56a from the −Z direction to the +Z direction, but both the front side spring component 56A and the back side spring component 56B need to be installed on the lens support 52. Therefore, when the inner side retaining part 56a of the spring component 56 is fixedly connected onto the lens support 52, the pressing force must be applied to the inner side retaining part 56a in a narrow range except the roots of the plurality of inner side connecting parts 56m. The reason is that, if the pressing force is applied to the roots of the inner side connecting parts 56*m*, the inner side connecting parts 56*m* will be greatly twisted or bent.

However, as shown in FIG. 12B schematically, even if the pressing force is prevented to be applied to the roots of the inner side connecting part 56*m*, the inner side connecting parts 56*m* cannot be prevented from being twisted or bent effectively, and the arc part except the root of the inner side retaining part 56*a* is bent and deformed in direction of X-Y plane, thus the outer side retaining part 56*b* rotates as shown in the arrow R, and a state of being inclined relative to the inner side retaining part 56*a* is formed. Therefore, the inner side retaining part 56*a* takes the Z axis direction as the normal direction, on the other hand, the outer side retaining part 56*b* is formed into the state of being rotated from the Z axis direction which causes incline, namely, the outer side retaining part 56*b* takes the Zr axis direction which is twisted from the Z axis direction as the normal direction.

Moreover, as indicated by the thick and black arrow G52 shown in FIG. 12A, when the offset force towards the side of the box body 53 is applied to the outer side retaining part 56*b* and the outer side retaining part 56*b* is connected with the box body 53, the restoring force in the +Z direction is generated for the wrist parts 56*c* since the offset force is applied, which results in the outer side connecting part 56*n* floating towards the +Z side, thus the outer side retaining part 56*b* needs to be pressed, and the pressing part is the circular ring part except the part connected with the root of the outer side connecting part 56*n*, and the pressing part is fixedly connected. Therefore, the circular ring part of the outer side retaining part 56 is badly bended near the root of the outer side connecting part 56*n*, and the outer side connecting part 56*n* is twisted, and the twisting of the outer side retaining part 56*b* relative to the Z axis direction is greater as mentioned above.

Hereon, the FIGS. 14A and 14B are used for detailedly describing the reason that the inner side retaining part 56*a* or the outer side retaining part 56*b* is bent and deformed in the directions of the X and Y plane when the inner side retaining part 56*a* or the outer side retaining part 56*b* is pressed.

As shown in FIG. 14A, the back side spring component 56B is configured at the back of the end of the lens support 52 in the −Z direction, for example, under the condition that the pressing force towards the +Z direction is applied to the inner side retaining part 56*a* of the back side spring component 56B and the inner side retaining part 56*a* is fixedly connected onto the lens support 52, the pressing force towards the +Z direction as show in the arrow G51 is applied to the inner side retaining part 56*a* on the −Z side by a plurality of inner side pressing clamps J51.

The lens support 52 and the box body 53 are respectively made from resin materials such as liquid crystal polymer or nylon, and there are soft and fine concave and convex points on the surfaces of these materials. Moreover, the thickness of the spring component 56 is formed to be about several 10 s-100 microns (in other words, about 10 microns to 999 microns), and the spring component 56 is easily deformed. Relatively, the inner side pressing clamp J51 is a clamp made of hard base material such as rolled steel so as to maintain the durability. Therefore, the spring component 56 arranged between the soft lens support 52 or the box body 53 and the hard inner side pressing clamps J51 is deformed under micro loading effect of the inner side pressing clamps J51.

Therefore, as shown in FIG. 14B, when the inner side retaining part 56*a* receives the pressing force of the inner side pressing clamps J51 so as to cling to the end of the lens support 52 on the −Z side, the inner side retaining part 56*a* is deformed along with the shape of the concave-convex on the surface of the lens support 52, and is sunken with the lens support 52 under the effect of the inner side pressing clamps J51, or is bent along the X direction and Y direction. As a result, the inner side connecting part 56*m* connected with the inner side retaining part 56*a* is twisted, while the wrist parts 56*c* are inclined and are bent and deformed along the X and Y directions.

Moreover, under the condition that the outer side retaining part 56*b* is connected to one surface of the base plate 53*a* of the box body 53 on the +Z side, the offset force is applied to the outer side retaining part 56*b* towards the −Z direction and meanwhile the outer side retaining part 56*a* is connected, thus the writ parts 56*c* generate the restoring force in the +Z direction, and the outer side retaining part 56*b* easily floats together with the outer side retaining part 56*n*. Therefore, as shown in FIG. 14C, the outer side retaining part 56*b* needs to be pressed in an extremely great range, but the root of the outer side connecting part 56*n* is deformed along the concave-convex shape of the box body 53, and the stress is concentrated on the edge part of the outer side pressing clamp J52, thus the part near the root of the outer side connecting part 56*n* is greatly deformed, or the outer side connecting part 56*n* is twisted, as a result that the twisting of the outer side retaining part 56*b* is greater relative to the inner side retaining part 56*a*. Moreover, under the conditions that the inner side retaining part 56*a* of the front side spring component 56A is connected to the end of the lens support 52 on the +Z side and the outer side retaining part 56*b* is connected to the surface of the magnet yoke 57 on the +Z side, the problems the same as that under the condition of the fixedly connected back side spring component 56B also appear.

As mentioned above, the spring component 56 is directly assembled on the lens driving device 50, the outer side retaining part 56*b* is twisted and inclined relative to the inner side retaining part 56*a*, and under the condition that the coil 54 for driving the lens of the lens driving device 50 is electrified, the lens support 52 forms the state of being slightly inclined relative to the original Z axis, the optical axis of the lens 51 is inclined, thus, when the lens support 52 begins to move towards the front of the Z axis (in the +Z direction), the problem that the lens driving device 50 is inclined appears.

SUMMARY OF THE INVENTION

In view of the existing problems, the present invention aims to provide a lens driving device capable of reducing the inclination occurred when the lens support begins to move.

The lens driving device comprises: a lens support, which is used for retaining a lens; a box body; spring component, which is used for suspending the lens support on the box body and is capable of moving towards the Z axis direction as the direction of the optical axis of the lens; and an electromagnetic driving mechanism, which is used for driving the lens support in the Z axis direction. The lens driving device is wherein the spring component comprises: an inner side retaining part, which is installed on the side of the lens support; an outer side retaining part, which is installed on the side of the box body; a plurality of wrist parts, which are configured between the inner side retaining part and the outer side retaining part, and are respectively extended in one or both of the circumference direction and the radial direction; inner side connecting parts, which are extended from the inner side retaining part to the side of the wrist parts, and are used for connecting one ends of the wrist parts with the inner side retaining part; outer side connecting parts, which are extended from the outer side retaining part to the side of the wrist parts, and are used for connecting the other ends of the wrist parts with the outer side retaining part; and necking parts, which are respectively formed on one or both of the connecting part roots connected with the inner side connecting part of the inner side retaining part and the connecting part roots connected with the outer side connecting parts of the outer side retaining part; the electromagnetic driving mechanism receives the acting force at the back of the Z axis on the side opposite to the side of the object to be shot at the initial state as the state before operation.

By utilizing the deformation of the necking parts, the lens driving device provided by the present invention is capable of absorbing the stress generated by the bending and deformation of the retaining part of the spring component along the directions of the X and Y plane, thus the stress generated based on the deformation of the necking parts cannot be transferred to each connecting part, and the twisting of the inner side connecting parts or the outer side connecting parts can be prevented. Therefore, useless stress applied onto the wrist parts can be reduced, thus each wrist part of the spring component can be at the state that the restoring forces at the back of the direction of the Z axis are balanced, namely, the balanced preloading (prepressing) is applied to each wrist part. Therefore, in the lens driving device formed by adding the offset force to the spring component, the inclination occurred when the lens support begins to move can be reliably reduced, thus the lens support can stably move to the direction of the object to be shot.

Moreover, as a preferable embodiment of the present invention, each necking part is formed to be serpentine. If the necking parts are formed to be serpentine, the inclination occurred when the lens support begins to move can be effectively reduced.

Moreover, as a preferable embodiment of the present invention, each necking part is formed to be straight line-shaped. If the necking parts are formed to be straight line-shaped, the inclination occurred when the lens support begins to move can be effectively reduced.

Moreover, as a preferable embodiment of the present invention, the width of the necking part is lower than the width of the wrist part (hereon, lower than means smaller than or equal to, while higher than means greater than or equal to). If the width of the necking part is lower than the width of the wrist part, the inclination occurred when the lens support begins to move can be effectively reduced.

Moreover, as a preferable embodiment of the present invention, concave parts are formed on the abutting part of the necking parts of the components for fixing the retaining parts on one side of the necking parts. Therefore, the necking parts can be deformed freely without being restricted, thus the spring component can be connected with each writs part at the state that preloading is equally applied to each wrist part. Therefore, the inclination occurred when the lens support begins to move can be reduced further.

Moreover, as a preferable embodiment of the present invention, the necking parts and the abutting parts for the necking parts of the components for fixing the retaining parts on one side of the necking parts are wrapped and cured by liquid sealing materials respectively. Therefore, at the state that the necking parts can be deformed freely without being restricted, the necking part is cured with the connecting parts connected with the necking parts, thus the spring component can be fixed at the state that preloading is equally applied to each wrist part. Therefore, the inclination occurred when the lens support begins to move can be reduced further.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The present invention is described through the embodiments as follows, the following embodiments do not limit claims in the present invention, and the combination of all features described in the embodiments does not necessary for solutions of the present invention.

Figure 1:
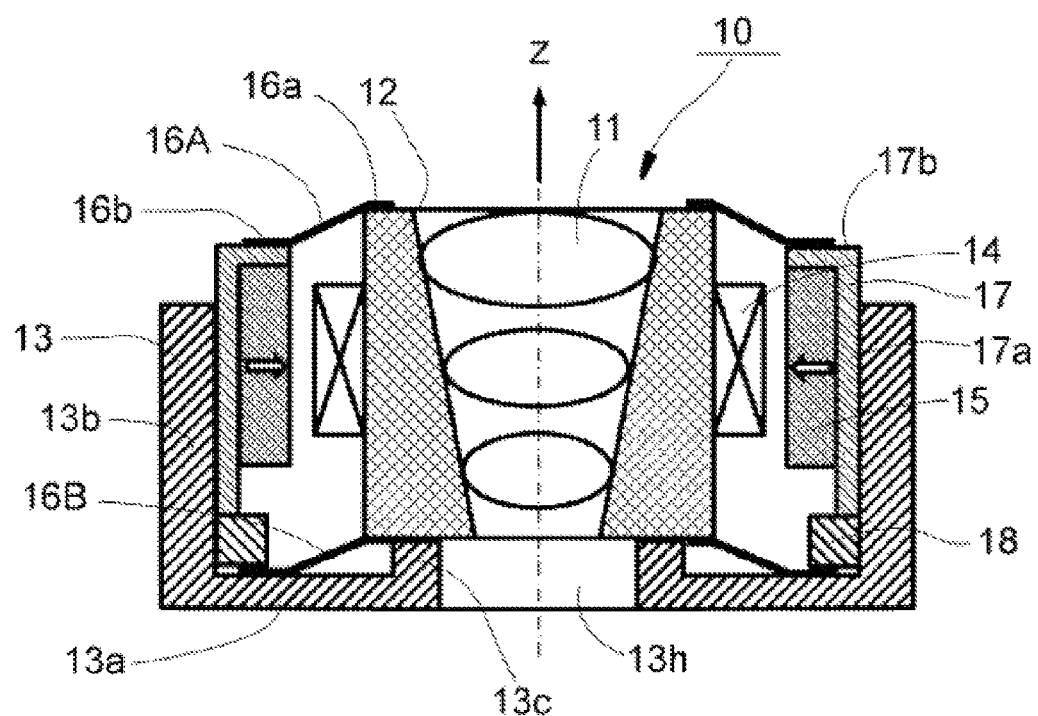
FIG. 1 is a longitudinal section view illustrating the structure of a lens driving device in according to an embodiment of the present invention.

FIG. 1 is a longitudinal section view illustrating the structure of a lens driving device 10 in according to an embodiment of the present invention.

The lens driving device 10 includes a lens support 12 for retaining a lens 11, a box body 13, a coil 14 for driving the lens, a magnet assembly 15 for driving the lens, a front side spring component 16A, a back side spring component 16B, a magnet yoke 17 and a spacer 18.

Hereafter, in the description, the direction of the optical axis of the lens 11 is taken as the Z axis direction, and the side of the object to be shot is taken as the front of Z axis (+Z side or +Z direction). Moreover, two axes which are mutually orthogonal and respectively orthogonal to the Z axis are taken as X axis and Y axis.

The lens support 12 is made of resin materials such as liquid crystal polymer or nylon, and is a cylindrical component for retaining the lens 11 formed by combining an object lens and an eye lens. The coil 14 for driving the lens is sleeved on the outer circumference side face of the lens support 12.

The box body 13 is made of resin materials such as liquid crystal polymer or nylon, and is configured on the outside of the lens support 12 in a manner of surrounding the lens support 12. The box body 13 includes: a disc-shaped base plate 13a, a cylindrical side wall 13b, and a circular ring-shaped restricting part 13c. An opening part 13h is formed in the central part of the disc-shaped base plate 13a. The cylindrical side wall 13b protrudes vertically from the outer edge part of the base plate 13a towards the +Z direction. The circular ring-shaped restricting part 13c is projected out towards the lens support 12 from the inner edge part of the opening part 13h and is used for restricting the position of the lens support 12 so that the position is taken as the backmost position of the lens support 12 when the coil 14 for driving the lens is electrified.

The coil 14 for driving the lens is a coil formed by winding a coated copper wire around the outer periphery of the lens support 12 along the circumference of the Z axis, and the appearance is formed to be cylindrical which is the same as the lens support 12 when being observed from the +Z side.

The magnet assembly 15 is a component formed by cylindrically configuring a plurality of circular arc-shaped magnets magnetized along the radial direction around the Z axis. The magnet assembly 15 and the coil 14 are partitioned at a preset interval and are arranged on the inner face side of the side wall 13b of the box body 13, and are used for generating a magnetic field radially towards the coil 14. An N pole of the magnet assembly 15 in the embodiment is arranged adjacent the lens support 12. The coil 14 and the magnet assembly 15 form an electromagnetic driving mechanism.

The magnet yoke 17 is composed of magnetic components such as soft iron and is a cylindrical component which looks like two L-shaped elements set oppositely from the section view. The magnet yoke 17 includes: a cylindrical part 17a which is configured between the magnet assembly 15 and the side wall 13b of the box body and is in a vertical sheet shape seen from the section view, and a circular ring part 17b which is positioned on the +Z side of the magnet 15. The circular ring part 17b is in a horizontal sheet shape seen from the section view.

The spacer 18 is arranged on the inside of the side wall 13b of the box body 13 along the +Z side of the base plate 13a, and is a component made of cylindrical resin, and supports the cylindrical part 17a of the magnet yoke 17 on the −Z side.

The front side spring component 16A and the back side spring component 16B are both circular ring-shaped leaf springs which are made of alloy composed of copper, nickel and tin/or such metals, and each defines a plurality of circular arc-shaped slots. Moreover, in the following description, the structures of the front side spring component 16A and the back side spring component 16B are approximately the same, thus the front side spring component 16A and the back side spring component 16B are both called spring component 16 under the condition that the front side spring component 16A and the back side spring component 16B do not need to be distinguished.

Figure 2:
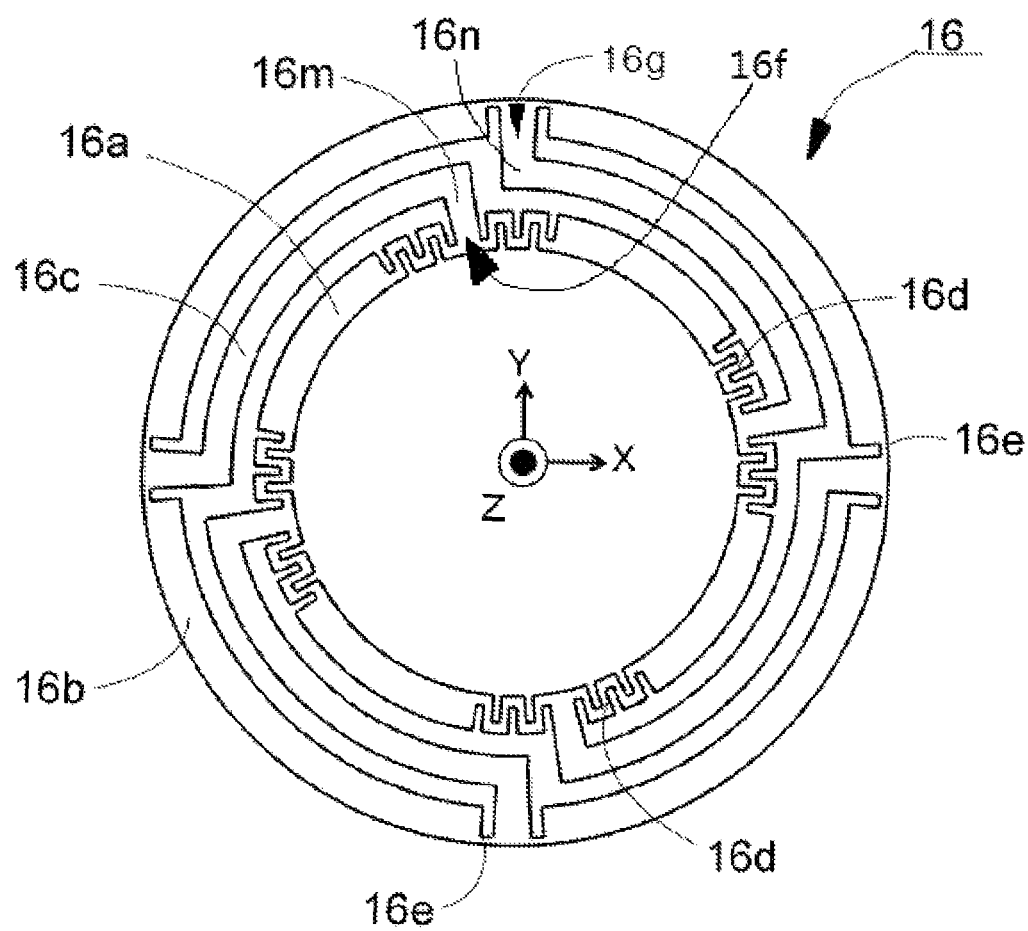
FIG. 2 is a top view illustrating a spring component provided with necking parts in according to an embodiment of the present invention.

As shown in FIG. 2, the spring component 16 includes: a circular ring-shaped inner side retaining part 16a installed on the lens support 12, a circular ring-shaped outer side retaining part 16b installed inside the box body 13, four approximately circular arc-shaped wrist parts 16c, four inner side connecting parts 16m, four outer side connecting parts 16n, a plurality of serpentine necking parts 16d formed on the inner side retaining part 16a; and a plurality of straight line-shaped necking parts 16e formed on the outer side retaining part 16b. The four wrist parts 16c are prolonged along the circumference direction, and each of which is used for connecting one of the four inner side retaining parts 16a with a corresponding one of the four outer side retaining parts 16b. Each inner side connecting part 16m extends from the inner side retaining part 16a in a radial direction to a corresponding one of the four wrist parts 16c positioned on the radial outer side, and is used for connecting one end of the corresponding one of the four wrist parts 16c with the inner side retaining part 16a. Each outer side connecting part 16n is prolonged from the outer side retaining part 16b in a radial direction to a corresponding one of the four wrist parts 16c positioned on the radial inner side, and is used for connecting the other ends of the corresponding one of the four wrist parts 16c with the outer side retaining part 16b.

The serpentine necking part 16d is narrower than the wrist part 16c (the size in the X and Y directions) in width, and is prolonged in the circumference direction while being zig-zagged repeatedly in a "⊐" shape along the radial direction. There are two serpentine necking parts 16d respectively arranged on two sides of a root 16f (inner side in the radial direction, or in other words, radial inner side) of each inner side connecting part 16m, and used for connecting the inner side retaining part 16a with the inner side connecting part 16m.

The straight line-shaped necking part 16d is narrower than the wrist part 16c (the size in the X and Y directions) in width, and is prolonged in the circumference direction. There are two straight line-shaped necking parts 16e respectively arranged on two sides of a root 16g (radial outer side) of each outer side connecting part 16n, and used for connecting the outer side retaining part 16b with the outer side connecting part 16n.

As shown in FIG. 1, the spring component 16 composed of the front side spring component 16A and the back side spring component 16B is spanned between the lens support 12 and the box body at the state (initial state) in which the coil 14 for driving the lens is not electrified, and the spring component 16 is installed at the state that the force is applied to the spring component 16 in the −Z direction which is the opposite side of the object to be shot.

In the lens driving device 10 as shown in FIG. 1, the inner side retaining part 16a positioned on the inner side of the front side spring component 16A is fixed on one surface of the lens support 12 on the +Z side, the outer side retaining part 16b positioned on the outer side of the front side spring component 16A is fixed on one surface of the circular ring part 17b of the magnet yoke 17 on the +Z side, the inner side retaining part 16a positioned on the inner side of the back side spring component 16B is fixed on one surface of the lens support 12 on the −Z side, and the outer side retaining part 16b positioned on the outer side of the front side spring component 16A is fixed on one surface of the base plate 13a of the box body 13 on the +Z side. Under the above condition, the spring component 16 is installed by adopting an assembling method similar to the prior art, and offset forces can be applied to the front side spring component 16A and the back side spring component 16B respectively. Therefore, each wrist part 16c of the spring component 16 plays a role of spring for suspending the lens support 12 on the box body 13.

Figure 3:
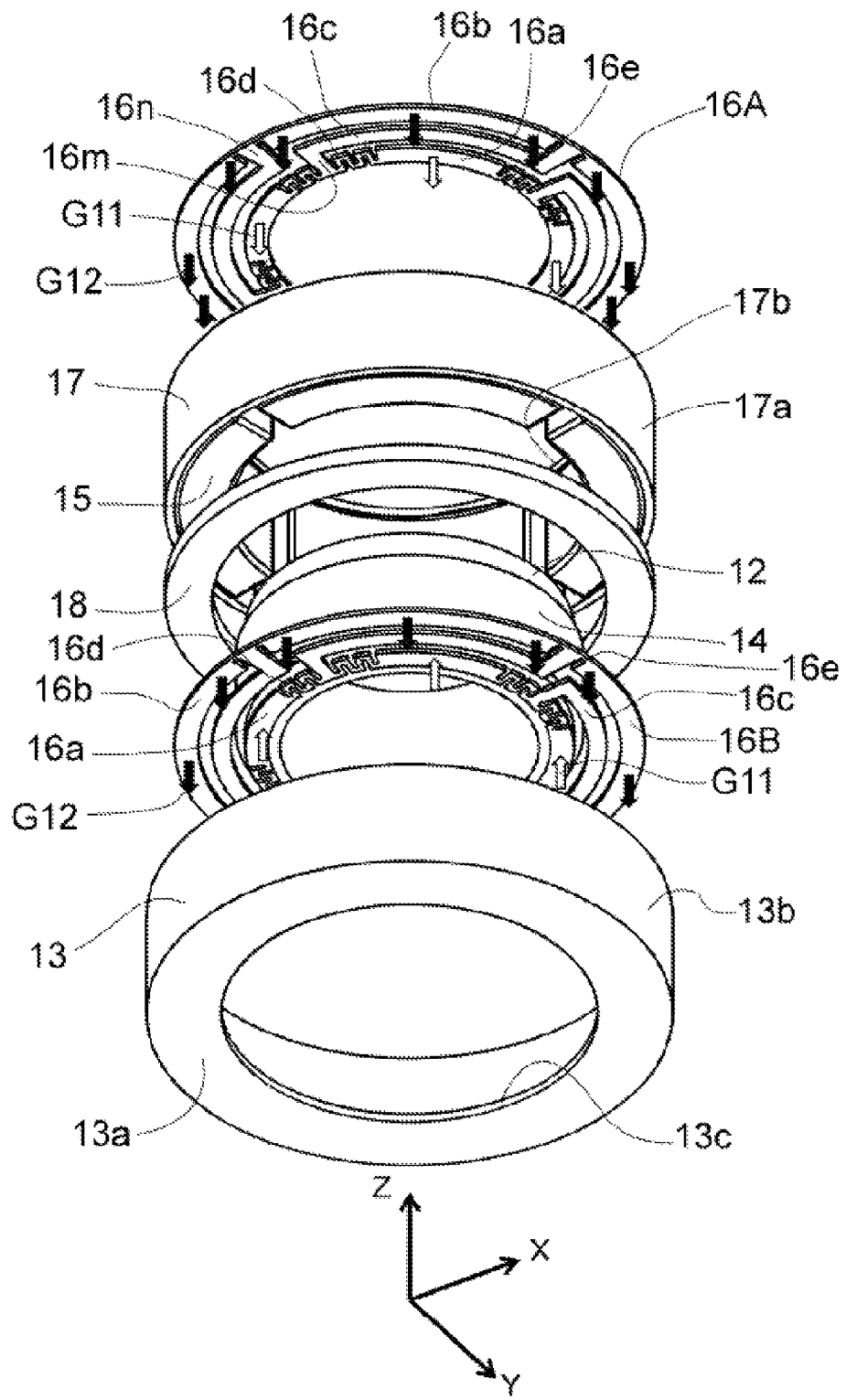
FIG. 3 is an exploded view illustrating the assembling of the lens driving device.

FIG. 3 is used for describing the assembling method of the lens driving device 10.

As shown in FIG. 3, after the inner side retaining part 16a of the back side spring component 16B is fixedly connected to the end of the lens support 12 on the −Z side, the outer side retaining part 16b of the back side spring component 16B is pressed on the surface of the base plate 13a of the box body on the +Z side, and meanwhile the outer side retaining part 16b is fixedly connected with the box body 13.

Then, the outer side retaining part 16b of the back side spring component 16B is wrapped on the +Z side by using the spacer 18, and after the magnet yoke 17 and the magnet assembly 15 are overlapped on the spacer respectively, the inner side retaining part 16a of the front side spring component 16A is fixedly connected to the end of the lens support 12 on the +Z side. Moreover, after the magnet assembly 15 is installed inside the cylindrical part 17a of the magnet yoke 17, the magnet yoke 17 integrated with the magnet assembly 15 can be installed on the spacer 18.

Moreover, the outer side retaining part 16b of the front side spring component 16A is pressed and fixed on the surface of the circular ring part 17b of the magnet yoke 17 on the +Z side by utilizing clamps and so on, thus the front side spring component 16A is fixedly connected relative to the box body 13. As the assembling method described above, in the process that the inner side retaining part 16a is fixedly connected on the side of the lens support 12, regardless of the front side spring component 16A or the back side spring component 16B, the inner side retaining part 16a and the outer side retaining part 16b are fixedly connected with the lens support 12 without being applied the offset force at the state that the inner side retaining part 16a and the outer side retaining part 16b are temporarily kept on the same plane.

Then, as shown in FIG. 3, a pressing force as shown in the hollow arrow G11 is applied in a range of the inner side retaining part 16a that the serpentine necking parts 16d are not included. Specifically, the pressing force in the +Z direction as shown in the arrow Gi1 on the −Z side is applied in the range of the inner side retaining part 16a of the back side spring component 16B that the serpentine necking parts 16d are not included, and the inner side retaining part 16a is fixedly connected with the end of the lens support 12 on the −Z side. The pressing force in the +Z direction as shown in the arrow Gi1 on the +Z side is applied in the range of the inner side retaining part 16a of the front side spring component 16A that the serpentine necking parts 16d are not included, and the inner side retaining part 16a is fixedly connected with the end of the lens support 12 on the +Z side.

Moreover, in the process that the outer side retaining part 16b is fixedly connected to the side of the box body 13, the pressing force as shown in the thick and black arrow G12 is applied to both the front side spring component 16A and the back side spring component 16B in a range of the outer side retaining part 16b that the straight line-shaped necking parts 16e are not included, and the outer side retaining part 16b is fixedly connected with the side of the box body 13 at the state that the offset force is applied in the −Z direction. Specifically, the pressing force from the +Z side to the −Z direction as shown in the arrow G12 is applied to the back side spring component 16B in a range of the outer side retaining part 16b of the back side spring component 16B that the straight line-shaped necking parts 16e are not included, and the outer side retaining part 16b is fixedly connected onto the surface of the base plate 13a of the box body 13 on the +Z side. The pressing force from the +Z side to the −Z direction as shown in the arrow G12 is applied to the front side spring component 16A in the range of the outer side retaining part 16b of the front side spring component 16A that the straight line-shaped necking parts 16e are not formed, and the outer side retaining part 16b is fixedly connected to the end of the circular ring part 17b of the magnet yoke 17 on the +Z side.

Figure 4A:
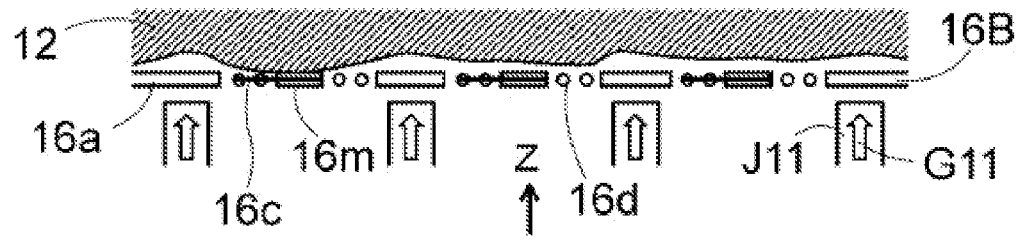
FIG. 4A, FIG. 4B, FIG. 4C, FIG. 4D, FIG. 4E are pattern diagrams illustrating a stress (deformation) state of the spring component in the lens driving device.
Figure 4B:
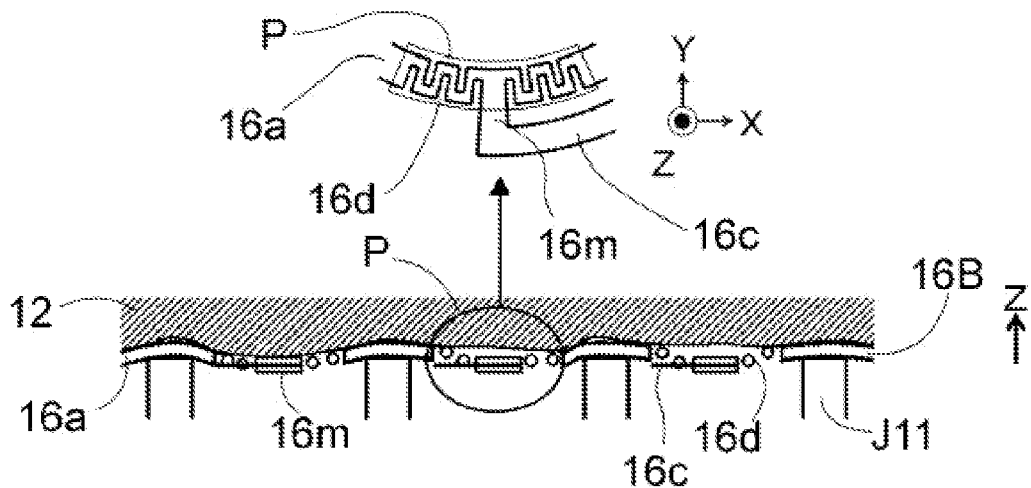
Figure 4C:
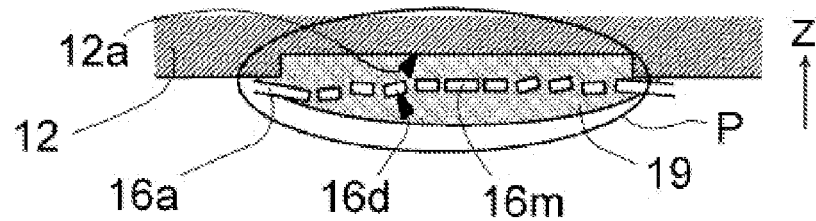

FIG. 4A, FIG. 4B and FIG. 4C are pattern diagrams respectively illustrating the states that strain (deformation) appears between the inner side retaining part 16a and the inner side connecting parts 16m when the back side spring component 16B provided with the serpentine necking parts 16d is fixedly connected to the end of the lens support 12 on the −Z side.

Firstly, as shown in FIG. 4A, the back side spring component 16B and the inner side pressing clamps J11 for applying the pressing force towards the +Z direction as shown in the hollow arrow Gi1 are respectively arranged at the back of the lens support 12. Then, as shown in FIG. 4B, the inner side pressing clamps J11 are pressed in the region of the inner side retaining part 16a that the serpentine necking parts 16d are not formed, and the back side spring component 16B is connected to the end of the lens support 12 on the −Z side.

Even if in the spring component 16 of the embodiment, the inner side retaining part 16a is bent in the direction of the X and Y plane due to the concave-convex shape that formed on the surface of the lens support 12 or the stress concentration generated by the inner side pressing clamps J11, the serpentine necking parts 16d are also deformed so as to absorb the bending in the directions of the X and Y plane, the inner side retaining part 16a is hardly bent at the position of the inner side connecting part 16m, and the inner side connecting parts 16m are not twisted or bent. Therefore, each wrist part 16c connected with the inner side connecting parts 16m is also maintained on the same X and Y plane as that before pressing, so that the inclination of the outer side retaining part 16b is reduced. As a result, even if the offset force is applied to the outer side retaining par 16b, the wrist parts 16c can also generate balanced restoring forces, and stable preloading (prepressing) is applied to the back side spring component 16B, so that the inclination of the lens driving device 10 occurred when the lens support 12 begins to move can be greatly reduced.

Right now, as shown in FIG. 4C, a concave part 12a is formed on part P for each serpentine necking part 16d of the lens support 12 to abut, and the concave part 12a is filled with liquid sealing material 19 composed of binding material so as to wrap and cure the serpentine necking part 16d and the inner side connecting part 16m. Along with the curing of the liquid sealing material 19, the serpentine necking parts 16d can be deformed freely in an unrestricted manner, and the inner side connecting part 16m is fixed at the state of being maintained at a proper position, so that the inclination occurred when the lens support 12 begins to move can be reduced more reliably. Moreover, under the condition that the inner side connecting part 16m dose not need to be wrapped by the liquid sealing material 19, only the serpentine necking parts 16d are wrapped by the liquid sealing material 19 while the inner side connecting parts 16m are not, and then the liquid sealing material 19 is cured.

Figure 4D:
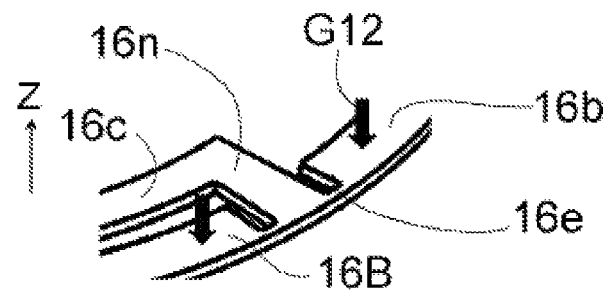
Figure 4E:
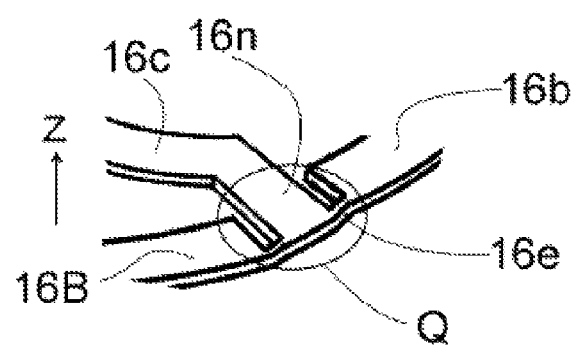

Moreover, FIG. 4D and FIG. 4E are local space diagrams illustrating that the outer side retaining part 16b of the outer side spring component 16B is fixedly connected onto the base plate 13a of the box body 13.

As shown in FIG. 4D, the pressing force as shown in the thick and black arrow G12 is applied to the region of the outer side retaining part 16b that the straight line-shaped necking parts 16e are not formed, and the back side spring component 16B is fixedly connected by using the offset force towards the −Z direction. As a result, as shown in FIG. 4E, even if the outer side retaining part 16b is bent in the directions of the X and Y plane, the straight line-shaped necking parts 16e are deformed based on the bending so as to absorb the pressing force, thus the outer side retaining part 16b is hardly deformed at the outer side connecting part 16n, and the outer side connecting part 16n is not twisted or bent. Therefore, connecting the outer side retaining part 16b by applying the pressing force, restoring forces generated by the wrist parts 16c will become balanced, and inclination dose not occur between the lens support 12 and the box body 13.

Moreover, the straight line-shaped necking parts 16e and the outer side connecting part 16n can be cured by utilizing the liquid sealing material 19. Specifically, similar to the conditions of the serpentine necking parts 16d and the inner side connecting part 16m as shown in FIG. 4C, a concave part is formed in the part Q of the base plate 13a of the box body 13 for the straight line-shaped necking parts 16e to abut, the straight line-shaped necking parts 16e and the outer side connecting part 16n are wrapped by the liquid sealing material 19 and then the liquid sealing material 19 is cured, the straight line-shaped necking parts 16e are deformed freely in an unrestricted manner, and the outer side connecting part 16n is fixed at the state of being maintained at the proper position, so that the inclination occurred when the lens support 12 begins to move can be reduced reliably. Moreover, under the condition that the outer side connecting part 16m dose not need to be wrapped by the liquid sealing material 19, only the straight line-shaped necking parts 16e are wrapped by the liquid sealing material 19 except the outer side connecting part 16n, and then the liquid sealing material 19 is cured.

Moreover, under the condition that the inner side retaining part 16a of the front side spring component 16A is fixedly connected with the end of the lens support 12 on the +Z side, which is similar to the condition of the back side spring component 16B, the inner side retaining part 16a is bent in the directions of the X and Y plane, because of the serpentine necking parts 16d, the serpentine necking parts 16d are deformed so as to absorb the bending and deformation in the directions of the X and Y plane, the inner side retaining part 16a is hardly bent at the inner side connecting part 16m, and the inner side connecting parts 16m are not twisted or bent. Therefore, the wrist part 16c connected with the inner side connecting part 16m is also maintained on the same X and Y plane before the pressing force is applied, so that the outer side retaining part 16b is difficult to incline.

Thus, under the condition that the outer side retaining part 16b of the front side spring component 16A is connected onto the surface of the circular ring part 17b of the magnet yoke 17 on the +Z side, which is similar to the condition of the back side spring component 16B, because of the existing of the straight line-shaped necking parts 16e, even if the outer side retaining part 16b is bent in the direction of the X and Y plane, the straight line-shaped necking parts 16e are deformed so as to absorb the bending and deformation in the direction of the X and Y plane, the outer side retaining part 16b is hardly deformed at the outer side connecting part 16n, and the outer side connecting parts 16n are not twisted or bent. Therefore, the pressing force is applied to the outer side retaining part 16b for connection, so that the restoring forces generated by the wrist parts 16c are balanced, and inclination dose not occur between the lens support 12 and the box body 13.

Moreover, the condition of the front side spring component 16A is also similar to the above, convex parts are formed in the parts for the serpentine necking parts 16d of the lens support 12 to abut, or in the parts for the straight line-shaped necking parts 16e of the circular ring part 17b of the magnet yoke 17 to abut, the necking parts 16d and 16e and the connecting parts 16m and 16n are wrapped by the liquid sealing material 19 respectively, and the liquid sealing material is cured, so that the inclination occurred when the lens support 12 begins to move is reduced more reliably.

Therefore, the inclination of the lens driving device 10 when the lens support 12 begins to move can be greatly reduced by forming the necking parts 16d and 16e on the spring component 16 as mentioned above.

Figure 5:
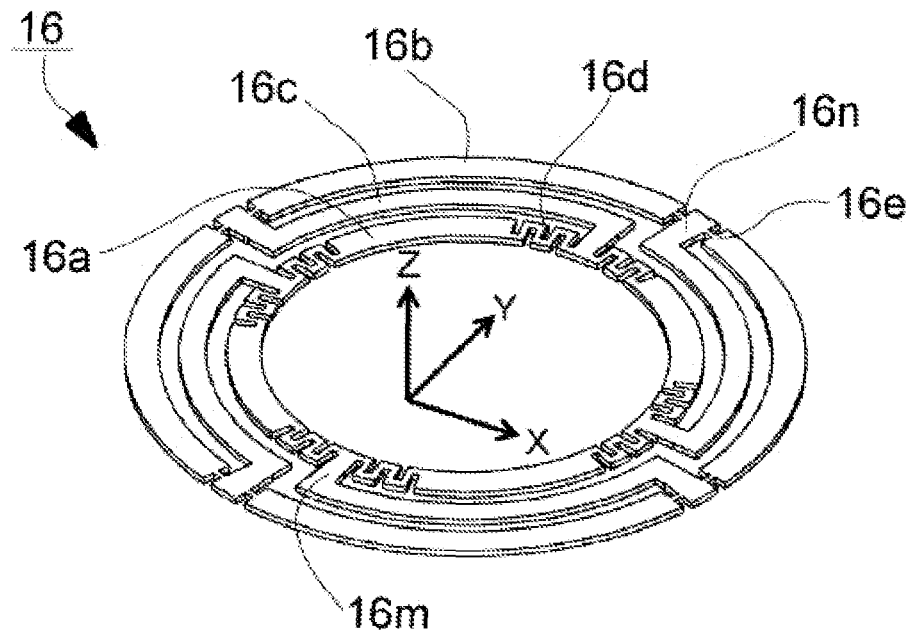
FIG. 5 is a perspective view of a spring component of a lens driving device in according to another embodiment of the present invention.

FIG. 5 is a perspective view illustrating another embodiment of the spring component 16.

The spring component 16 as shown in FIG. 5 is located at the state that the position of the straight line-shaped necking parts 16e formed on the outer side retaining part 16b of the spring component 16 is changed. The straight line-shaped necking parts 16e at the two sides of the outer side connecting part 16n are extended from the central part of the outer side retaining part 16b in the width direction (X and Y direction) to the outer side connecting part 16n along the peripheral direction. The same to the spring component 16 used in the above embodiment, the straight line-shaped necking parts 16e of the spring component 16 in this embodiment can be deformed freely in unrestricted manner, and the outer side connecting parts 16n are fixed at the state of being maintained at proper positions, thus the inclination occurred when the lens support 12 begins to move can be reduced.

Figure 6:
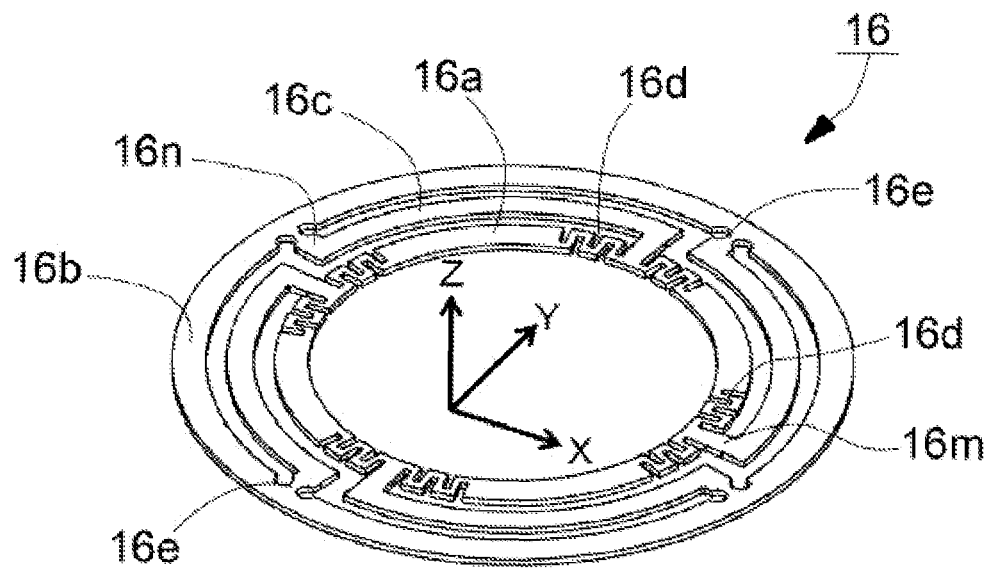
FIG. 6 is a perspective view of a spring component of a lens driving device in according to further another embodiment of the present invention.

FIG. 6 is a perspective view illustrating further another embodiment of the spring component 16.

The spring component 16 as shown in FIG. 6 is located at the state that the position and orientation of the straight line-shaped necking part 16e formed on the outer side retaining part 16b of the spring component 16 are changed. The connecting part of the straight line-shaped necking part 16e and the outer side connecting part 16n is formed to be arc-shaped on the inner peripheral side of the outer side retaining part 16b. The spring component 16 of this embodiment is the same as the spring component 16 used in the above embodiment, the straight line-shaped necking parts 16e can be deformed freely in unrestricted manner, and the outer side connecting parts 16n are fixed at the state of being maintained at proper positions, thus the inclination occurred when the lens support 12 begins to move can be reduced.

Figure 7:
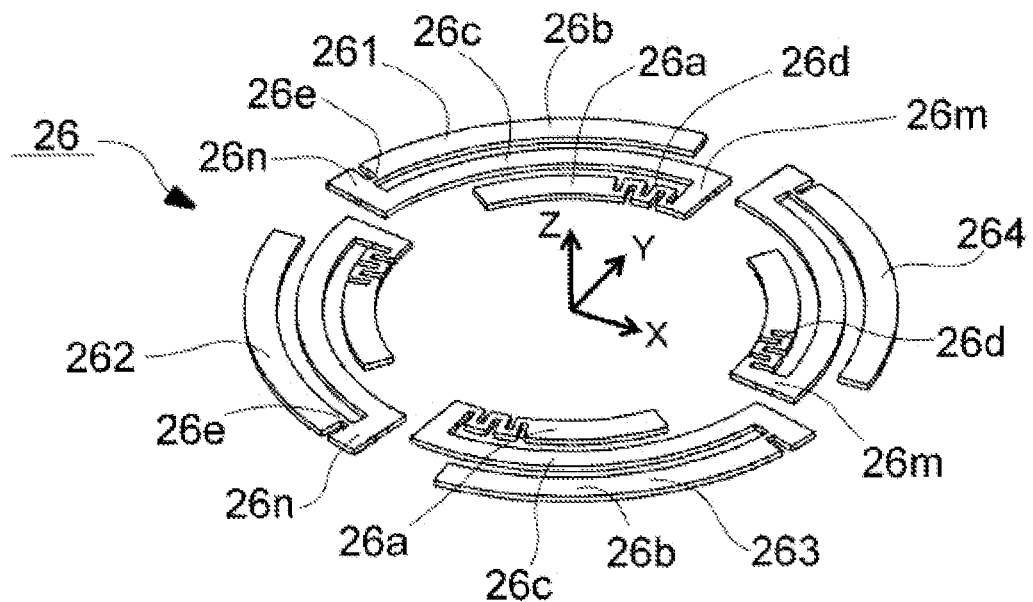
FIG. 7 is a perspective view of a spring component of a lens driving device in according to another embodiment of the present invention.

FIG. 7 is a perspective view illustrating the spring component 26 of another embodiment.

The spring component 26 as shown in FIG. 7 includes four spring components divided at 90-degree intervals by taking the central axis as an original point, and is composed of split spring components 261, 262, 263, 264. Each split spring component 261, 262, 263, 264 includes: an approximately circular arc-shaped inner side retaining part 26a installed on the lens support 12, an approximately circular arc-shaped outer side retaining part 26b installed inside the box body 13, an approximately circular arc-shaped wrist part 26c, an inner side connecting part 26m, an outer side connecting part 26n, a straight line-shaped necking part 26e formed on the outer side retaining part 26b and a serpentine necking part 26d formed on the inner side retaining part 26a. Wherein the approximately circular arc-shaped wrist part 26c is prolonged along the circumference direction and is used for connecting the inner side retaining part 26a with the outer side retaining part 26b. The inner side connecting part 26m is prolonged from the inner side retaining part 26a to the wrist part 26c positioned on the radial outer side and is used for connecting one end of the wrist part 26c with one end of the inner side retaining part 26a. The outer side connecting part 26n is prolonged from the outer side retaining part 26b to the wrist part 26c positioned on the radial inner side and is used for connecting the other end of the wrist part 26c with one end of the outer side retaining part 26b.

Moreover, the serpentine necking part 26d is the same as the serpentine necking part 16d or the straight line-shaped necking part 16e of the spring component 16 as shown in the above mentioned embodiments, has a width narrower than that of the wrist part 26c (size in the X and Y direction), and is extended in the circumference direction while being zig-zagged along the radial direction. Moreover, the straight line-shaped necking part 26e has a width narrower than that of the wrist part 26c (size in the X and Y direction), and is extended in the circumference direction.

As shown in FIG. 7, the condition that the serpentine necking part 26d and the straight line-shaped necking part 26e of the spring component 26 are only formed on single side of the inner side connecting part and the outer side connecting part 26m and 26n respectively is different from the condition of the spring component 16 as shown in the embodiments mentioned above. Even if under the condition that the necking parts 26d and 26e are only formed on single side of the inner side connecting part and the outer side connecting part 26m and 26n respectively, the serpentine necking parts 26d can also be deformed freely in an unrestricted manner, and the inner side connecting parts 26m are fixed at the state of being maintained at the proper positions. Moreover, similarly, the straight line-shaped necking parts 26e are deformed freely in an unrestricted manner, and the outer side connecting parts 26n can be fixed at the state of being maintained at the proper positions, thus the effect that the inclination is reduced when the lens support 12 begins to move can be achieved.

Moreover, the number of the split spring components 261, 262, 263, 264 of the embodiment is not limited to four, and if the split number is more than two, any number of the split spring components can be suitable.

Figure 8A:
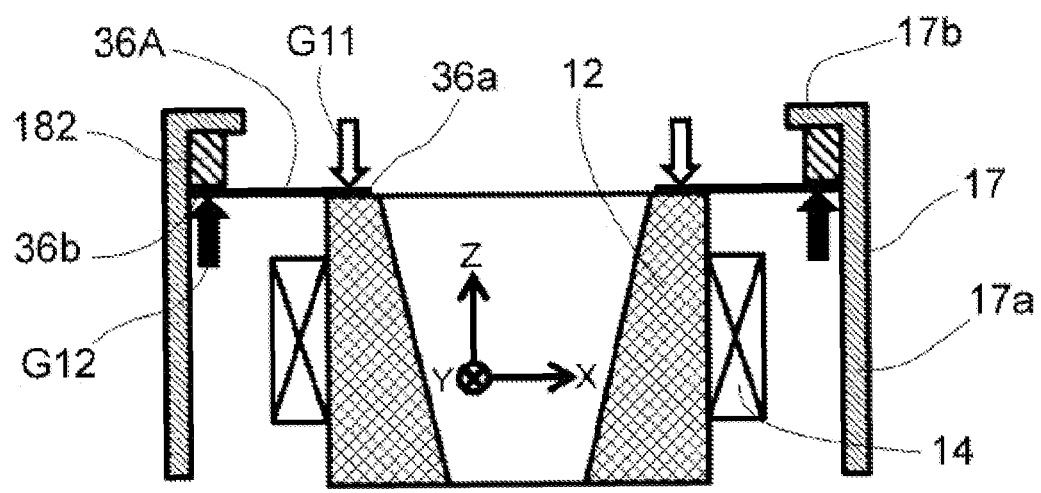
FIG. 8A, FIG. 8B, FIG. 8C are exploded views illustrating another assembling method of the lens driving device.
Figure 8B:
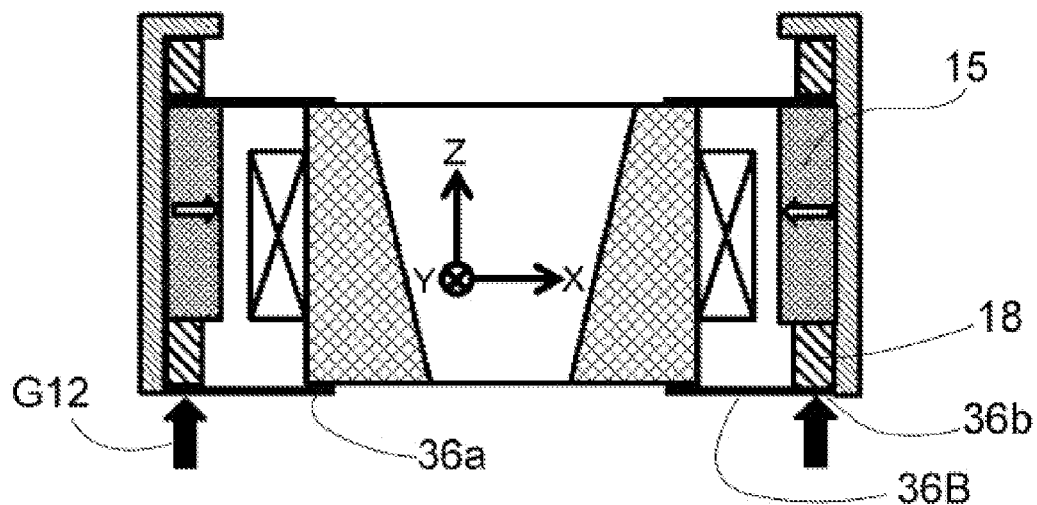
Figure 8C:
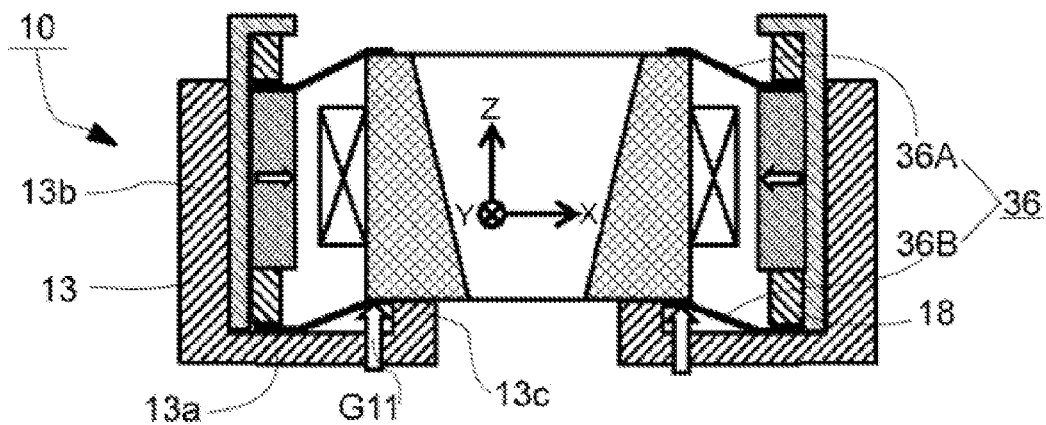

Moreover, the lens driving device 10 of the present invention can be assembled by adopting the method as shown in FIG. 8A, FIG. 8B and FIG. 8C.

Figure 9:
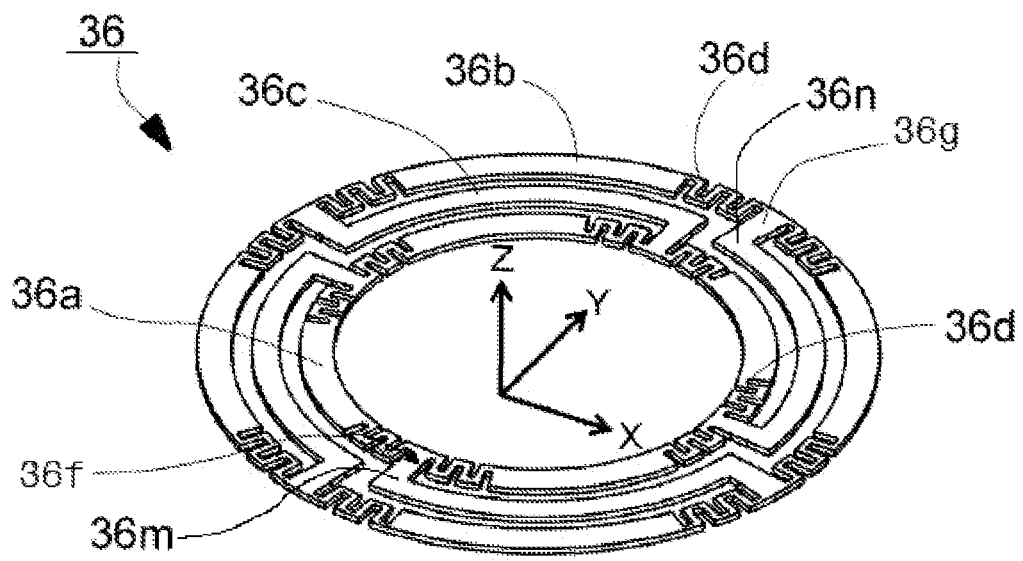
FIG. 9 is a perspective view of a spring component of a lens driving device in according to further another embodiment of the present invention.

FIG. 9 is a perspective view illustrating the spring component 36 of further another embodiment. Firstly, FIG. 9 is used for describing the spring component 36. The spring component 36 composed of the front side spring component 36A and the back side spring component 36B includes: a circular ring-shaped inner side retaining part 36a installed on the lens support 12, a circular ring-shaped outer side retaining part 36b installed inside the box body 13, four approximately circular arc-shaped wrist parts 36c, four inner side connecting parts 36m, four outer side connecting parts 36n, and a plurality of serpentine necking parts 36d. Wherein the four wrist parts 36c are prolonged along the circumference direction, and are used for connecting the inner side retaining part 36a with the outer side retaining part 36b. The inner side connecting part 36m is prolonged from the inner side retaining part 36a to the wrist part 36c positioned on the radical outer side, and is used for connecting one end of the wrist parts 36c with the inner side retaining part 36a. The outer side connecting part 36n is prolonged from the outer side retaining part 36b to the wrist part 36c positioned on the radial inner side, and is used for connecting the other end of the wrist parts 36c with the outer side retaining part 36b. The serpentine necking parts 36d are formed both on the inner side retaining part 36a and the outer side retaining part 36b.

The serpentine necking part 36d has a width narrower than that of the wrist part 36c (size in the X and Y direction), is zigzagged in a "⊐" shape in radial direction, and is extended along the circumference direction at the same time; and the serpentine necking parts 36d are respectively arranged on the two sides of the root 36f of the inner side part in the diameter direction of the inner side connecting part 36m and on the two sides of the root 36g of the outer side part in the diameter direction of the outer side connecting part 36n.

As shown in FIG. 8A, a second spacer 182 is installed on the −Z direction of the circular ring part 17b of the magnet yoke 17 in advance, and the front side spring component 36A is configured between the second spacer 182 and the lens support 12. Namely, after the inner side retaining part 36a of the front side spring component 36A is fixedly connected to the end of the lens support 12 on the +Z side, the outer side retaining part 36b is fixedly connected to the −Z side of the second spacer 182. When the front side spring component 36A is used for temporarily retaining the inner side retaining part 36a and the outer side retaining part 36b to be maintained on the same plane, the inner side retaining part 36a is fixedly connected on the +Z side of the front side end of the lens support 12, and the outer side retaining part 36b is fixedly connected on the −Z side of the second spacer 182. Namely, in the assembling method of the lens driving device 10 as shown in FIG. 8, during the period that the inner side retaining part 36a of the front side spring component 36A is fixedly connected with the outer side retaining part 36b, the operation is carried out without applying the offset force.

Moreover, as shown in FIG. 8B, the magnets of the magnet assembly 15 for driving and the spacer 18 are respectively installed on the inner peripheral side of the cylinder part 17a of the magnet yoke 17, and after the outer side retaining part 36b of the back side spring component 36B is connected to the −Z side of the spacer 18, the inner side retaining part 36a of the back side spring component 36B is fixedly connected onto the end of the lens support 12 on the −Z side.

Hereon, the distance between the −Z side of the second spacer 182 and the −Z side of the spacer 18 is set to be equal to that between the respective inner side retaining parts 36a connected with the lens support 12 of the front side spring component 36A and the back side spring component 36B. Moreover, similar to the front side spring component 36A, the inner side retaining part 36a and the outer side retaining part 36b of the back side spring component 36B are retained at the state that the inner side retaining part 36a and the outer side retaining part 36b are maintained on the same plane, namely are fixedly connected without applying the offset force.

Then, as shown in FIG. 8C, the side wall 13b of the box body 13 begins to slide from the back of the magnet yoke 17 and is inserted in the outside of the cylinder part 17a, the restricting part 13c of the box body 13 is used for extruding the lens support 12 towards the front side of the Z axis and applying the offset force to the spring component 36, and after the outer side retaining part 36 of the back side spring component 36B is clamped by the spacer 18 and the base plate 13a of the box body 13, the box body 13 is adhered and fixed with the magnet yoke 17, so that the assembling of the lens driving device 10 is completed. Thus, the lens driving device 10 which is the same as the assembled lens driving device 10 can be obtained by utilizing the method described in FIG. 3, so that the inclination occurred when the lens support 12 begins to move can be greatly reduced.

Right now, similar to the structure as shown in the embodiment, the concave parts are formed in the parts for the serpentine necking part 36d to abut, each serpentine necking part 36d is wrapped by the liquid sealing material 19, and the liquid sealing material is cured and fixed, so that the inclination occurred when the lens support 12 begins to move can be reduced more reliably.

Figure 10:
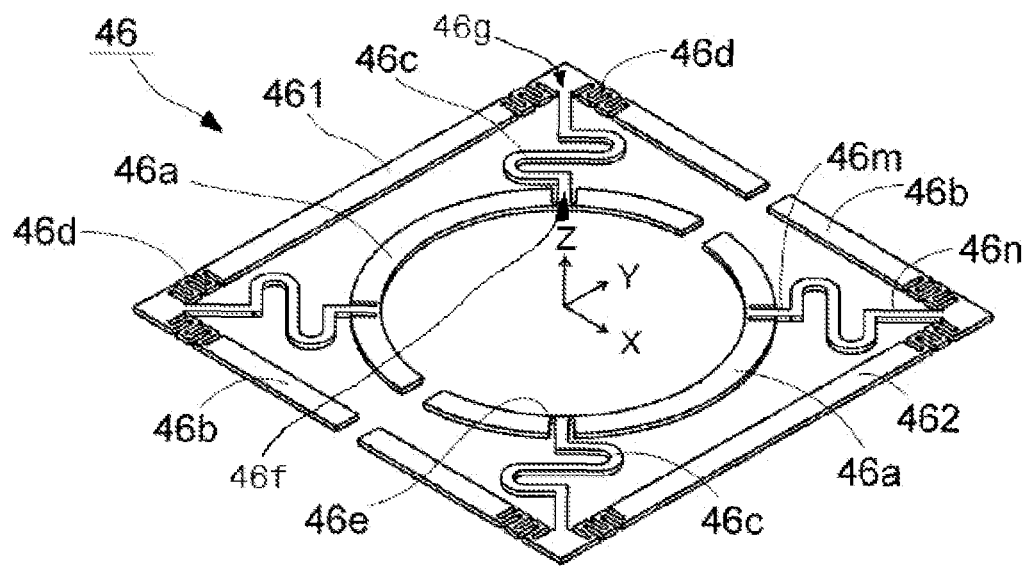
FIG. 10 is a perspective view of a spring component of a lens driving device in according to another embodiment of the present invention.
Figure 11:
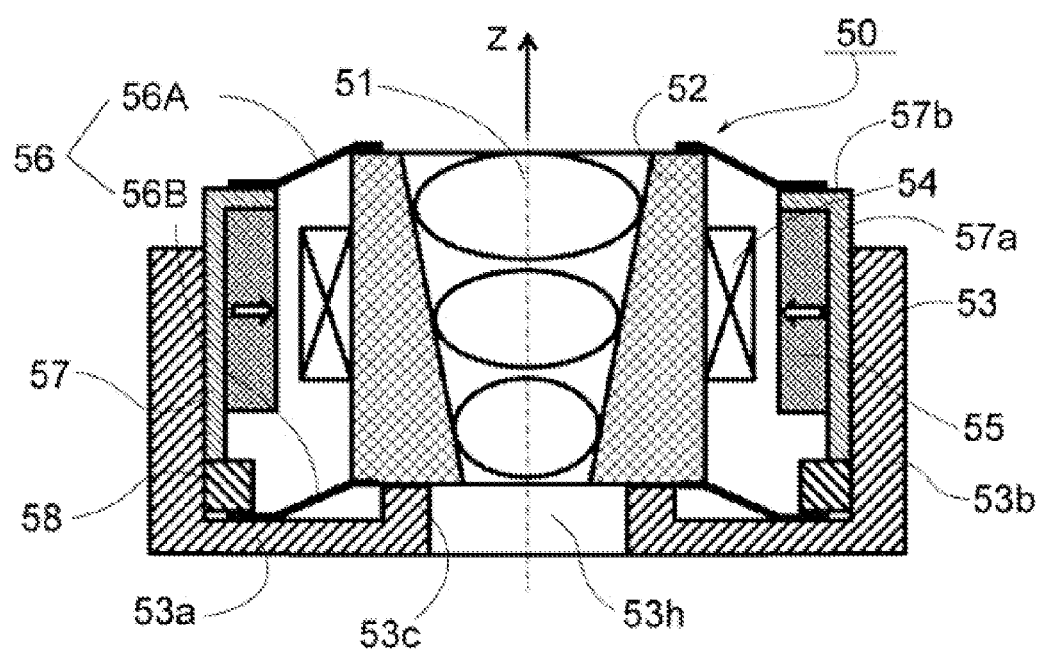
FIG. 11 is a longitudinal section view illustrating the structure of an existing lens driving device.
Figure 12A:
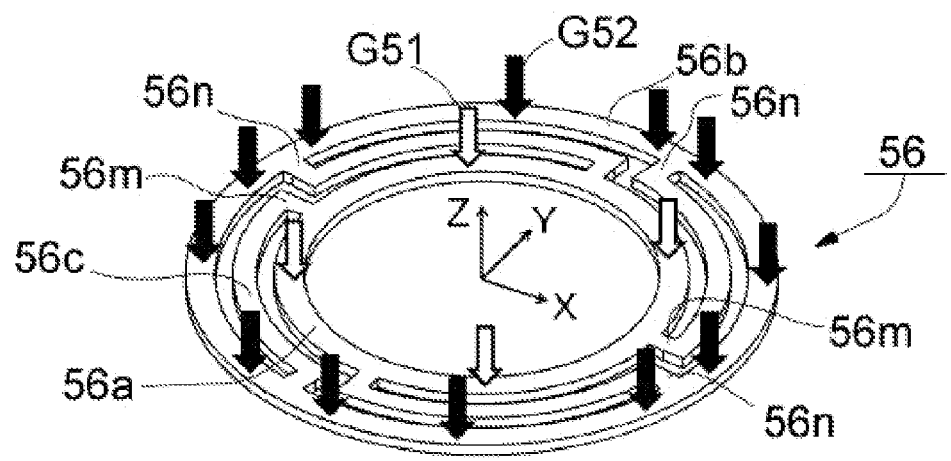
FIG. 12A, FIG. 12B are diagrams illustrating a spring component in the existing lens driving device.
Figure 12B:
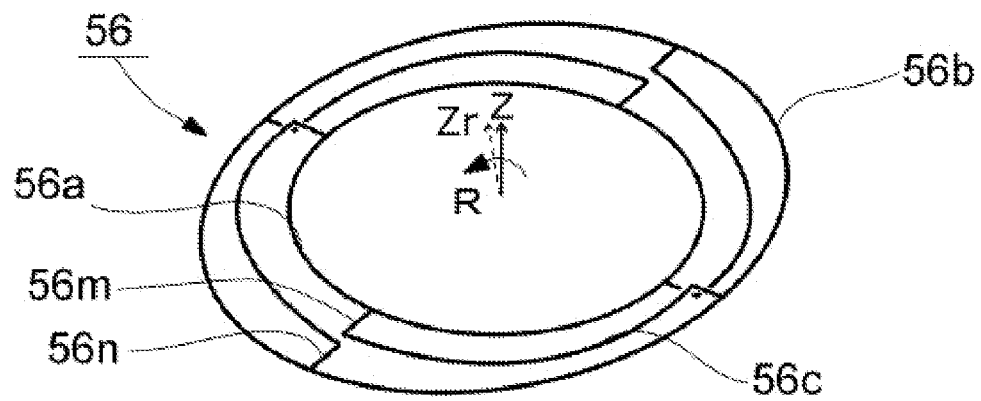
Figure 13A:
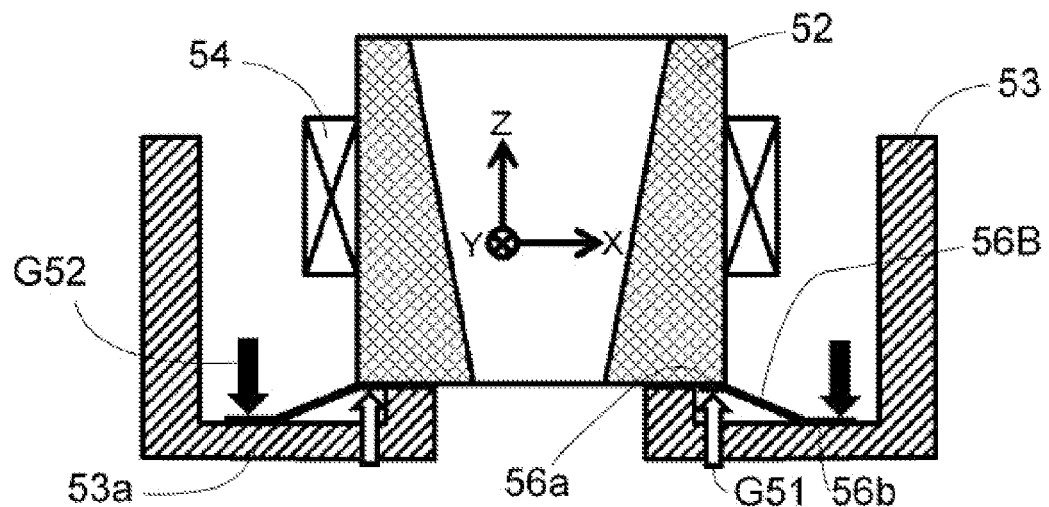
FIG. 13A, FIG. 13B, FIG. 13C are diagrams illustrating the assembling method of the lens driving device of FIG. 11.
Figure 13B:
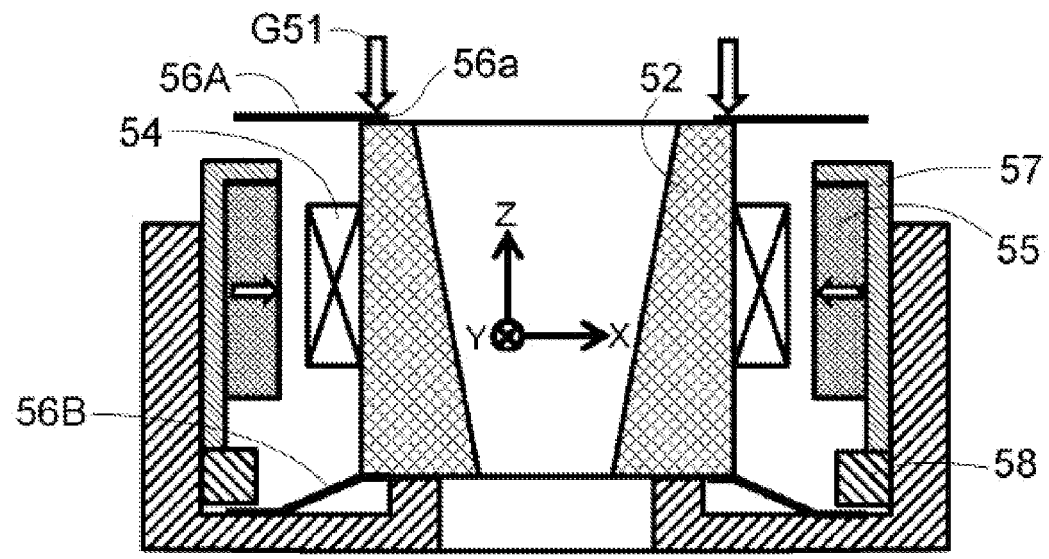
Figure 13C:
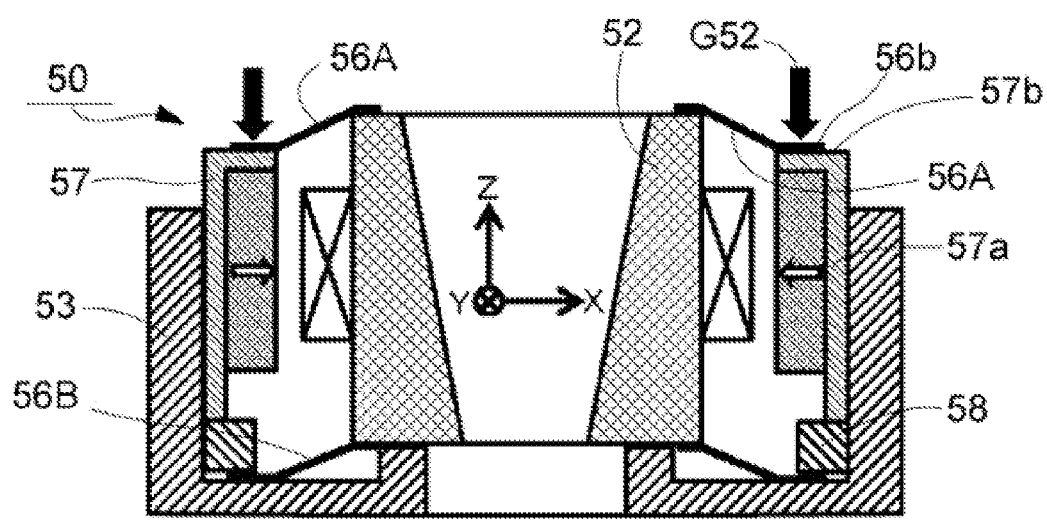
Figure 14A:
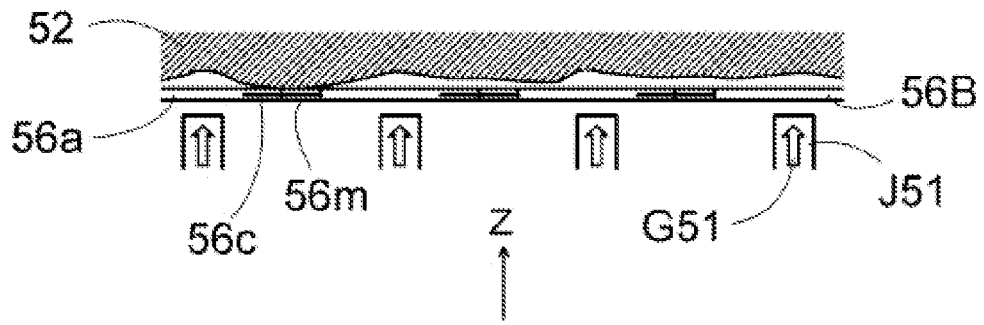
FIG. 14A, FIG. 14B, FIG. 14C are mode patterns illustrating the stress state of the existing spring component.
Figure 14B:
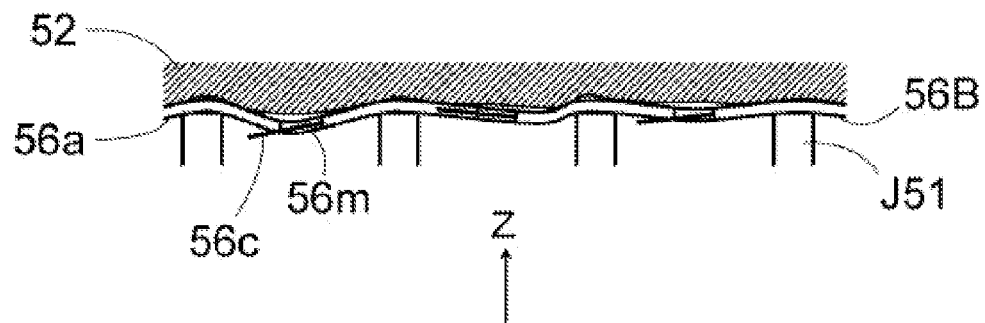
Figure 14C:
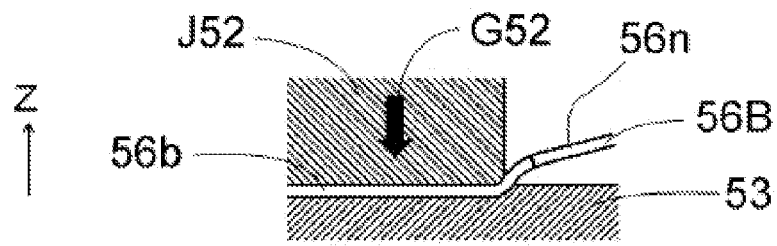

FIG. 10 is a space diagram of the spring component 46 of another embodiment, and the lens diving device 10 can also be composed of the spring component 46 with the bent wrist parts 46c as shown in FIG. 10.

Namely, the spring component 46 is provided with two split spring components 461 and 462, and the two split spring components 461 and 462 are respectively provided with the inner side retaining part 46a for dividing the circular ring into the +X side and the −X side and the outer side retaining part 46b for dividing the rectangular frame body into the +X side and the −X side.

Each split spring component 461, 462 includes: an approximately circular arc-shaped inner side retaining part 46a installed on the lens support 12, an approximately U-shaped frame-shaped outer side retaining part 46b installed inside the box body 13, a bent wrist part 46c, an inner side connecting part 46m, an outer side connecting part 46n, a straight line-shaped necking part 46e formed on the inner side retaining part 46a and serpentine necking part 46d formed on the outer side retaining part 46b. Wherein the bent wrist part 46c is prolonged along the circumference direction in the radial direction and is used for connecting the inner side retaining part 46a with the outer side retaining part 46b. The inner side connecting part 46m is prolonged from the inner side retaining part 46a to the radial outer side and is used for connecting one end of the wrist part 46c with the inner side retaining part 46a. The outer side connecting part 46n is prolonged from the outer side retaining part 46b to the radial inner side and is used for connecting the other end of the wrist part 46c with the outer side retaining part 46b.

Even if the spring component 46 is provided with the serpentine wrist parts 46c, the straight line-shaped necking parts 46e and the serpentine necking parts 46d are respectively formed at the root 46f of the connecting parts of inner side retaining part 46a and the inner side connecting parts 46m and one or both of the roots 46g of the connecting parts of the outer side retaining part 46b and the outer side connecting parts 46n, so that one or both of the inner side connecting part 46m and the outer side connecting part and 46n are fixed at the state of being maintained at the proper position, thus the effect that the inclination occurred when the lens support 12 begins to move is reduced can be obtained.

Moreover, one end of the wrist part 46c of the spring component 46 as shown in FIG. 10 is serpentine along the circumference direction and the other end of the wrist part 46c is extended in the radial direction, but the wrist part 46c is not restricted to this, or one end of the wrist part 46c is serpentine in the radial direction and the other end of the wrist part 46c is extended along the circumference direction, or mixed combination that one end of the wrist part is serpentine along the circumference direction and the other end of the wrist part is extended in the radial direction and one end of the wrist part is serpentine in the radial direction and the other end of the wrist part is extended along the circumference direction is used. Even if the spring component is provided with the wrist parts for implementing various deformations, if the serpentine necking parts 46d or the straight line-shaped necking parts 46e are formed on one or both of the roots 46f of the connecting parts of the inner side retaining part 46a and the inner side connecting parts 46m and the roots 46g of the connecting parts of the outer side retaining part 46b and the outer side connecting parts 46n, the inclination occurred when the lens support 12 begins to move can also be reduced.

Except the spring component composed of the serpentine necking parts formed on one side without offset force being applied and the straight line-shaped necking parts formed on one side with the offset force being applied, even if the spring component composed of the straight line-shaped necking parts formed on one side without offset force being applied and the serpentine-shaped necking parts formed on one side with the offset force being applied is used, or the spring component composed of the necking parts formed on one side without offset force being applied and on one side with the offset force is used, or the spring component composed of the straight line-shaped necking parts formed on one side without offset force being applied and on one side with the offset force being applied is used, or the spring component composed of the serpentine necking parts or the straight line-shaped necking parts formed on any side without offset force being applied and the side with the offset force being applied, the inclination occurred when the lens support 12 begins to move can also be reduced.

The embodiments described above describe the present invention, but the scope of the technology of the present invention is not limited to the scope recorded in the embodiments. A person skilled in the art can know that it is obvious that the embodiments can changed or improved variously. According to the claims, it is obvious that the changed or improved embodiments also can be included in the technical scope of the present invention.

For example, in the embodiments, the four approximately circular arc-shaped wrist parts 16c are extended along the circumference direction so that the inner side retaining part 16a is connected with the outer side retaining part 16b, but the number of the wrist parts 16c is not restricted to this, and more than two writ parts are suitable. Moreover, in the embodiments, the shapes of the lens support 12 and the box body 13 are cylinders, but also can be formed to be quadrangular barrel-shaped or octagonal barrel-shaped. Moreover, the shape of the coil 14 for driving also can be formed to be quadrangular barrel-shaped or octagonal barrel-shaped. Moreover, the shapes of the front side spring component 16A and the back side spring component 16B are not restricted to be circular ring-shaped, and also can be formed to be polygonal ring-shaped corresponding to the shape of the lens support 12 or the box body 13.

What is claimed is:
1. A lens driving device, comprising:
a lens support for retaining a lens;
a box body;
spring components for suspending the lens support on the box body and enabling the lens support to move along the Z axis direction as the direction of the optical axis of the lens; and
an electromagnetic driving mechanism for driving the lens support to move along the Z axis direction;
wherein each spring component comprises:
an inner side retaining part installed on the lens support;
an outer side retaining part installed on the box body;
a plurality of wrist parts, configured between the inner side retaining part and the outer side retaining part and prolonged in one or both of a circumference direction and a radial direction;
a plurality of inner side connecting parts, extending from the inner side retaining part to the plurality of wrist parts respectively and each configured for connecting one end of a corresponding one of the plurality of wrist parts with the inner side retaining part;
a plurality of outer side connecting parts, extending from the outer side retaining part to the plurality of wrist parts respectively and each configured for connecting the other end of a corresponding one of the plurality of wrist parts with the outer side retaining part; and
a plurality of necking parts, formed on first roots and/or second roots;
wherein each first root is a root of a connecting part, connected with one of the plurality of inner side connecting parts, of the inner side retaining part; the second root is a root of a connecting part, connected with one of the plurality of outer side connecting parts, of the outer side retaining part; a width of each necking part is smaller than that of the wrist part;

the electromagnetic driving mechanism receives an acting force at the back of the Z axis on the side opposite to the side of an object to be shot at an initial state as the state before operation.

2. The lens driving device of claim 1, wherein each of the plurality of necking parts is formed to be serpentine.

3. The lens driving device of claim 2, wherein concave parts are formed on the lens support for fixing the inner side retaining parts and/or the box body for fixing the outer side retaining parts, the necking parts of the retaining parts abut to the concave parts.

4. The lens driving device of claim 3, wherein parts of the lens support and the box body for fixing the retaining parts and for the necking parts to abut, and the necking parts are wrapped by liquid sealing material, and are fastened.

5. The lens driving device of claim 2, wherein parts of the lens support and the box body for fixing the retaining parts and for the necking parts to abut, and the necking parts are wrapped by liquid sealing material, and are cured.

6. The lens driving device of claim 1, wherein each of the plurality of necking parts is formed to be straight line-shaped.

7. The lens driving device of claim 6, wherein concave parts are formed on the lens support for fixing the inner side retaining parts and/or the box body for fixing the outer side retaining parts, the necking parts of the retaining parts abut to the concave parts.

8. The lens driving device of claim 7, wherein parts of the lens support and the box body for fixing the retaining parts and for the necking parts to abut, and the necking parts are wrapped by liquid sealing material, and are fastened.

9. The lens driving device of claim 6, wherein parts of the lens support and the box body for fixing the retaining parts and for the necking parts to abut, and the necking parts are wrapped by liquid sealing material, and are cured.

10. The lens driving device of claim 1, wherein concave parts are formed on the lens support for fixing the inner side retaining parts and/or the box body for fixing the outer side retaining parts, the necking parts of the retaining parts abut to the concave parts.

11. The lens driving device of claim 10, wherein parts of the lens support and the box body for fixing the retaining parts and for the necking parts to abut, and the necking parts are wrapped by liquid sealing material, and are fastened.

12. The lens driving device of claim 1, wherein parts of the lens support and the box body for fixing the retaining parts and for the necking parts to abut, and the necking parts are wrapped by liquid sealing material, and are cured.

13. A lens driving device, comprising:
a lens support for retaining a lens;
a box body;
spring components for suspending the lens support on the box body and enabling the lens support to move along the Z axis direction as the direction of the optical axis of the lens; and
an electromagnetic driving mechanism for driving the lens support to move along the Z axis direction;
wherein each spring component comprises:
an inner side retaining part installed on the lens support;
an outer side retaining part installed on the box body;
a wrist part, configured between the inner side retaining part and the outer side retaining part and prolonged in one or both of a circumference direction and a radial direction;
an inner side connecting part, extending from the inner side retaining part to the wrist part and configured for connecting one end of the wrist part with the inner side retaining part;
a outer side connecting part, extending from the outer side retaining part to the wrist part and configured for connecting the other end of the wrist part with the outer side retaining part; and
at least a necking part, formed on a first root and/or a second root;
wherein the first root is a root of a connecting part, connected with the inner side connecting part, of the inner side retaining part; the second root is a root of a connecting part, connected with the outer side connecting parts, of the outer side retaining part; a width of each necking part is smaller than that of the wrist part;
the electromagnetic driving mechanism receives an acting force at the back of the Z axis on the side opposite to the side of an object to be shot at an initial state as the state before operation.

* * * * *